Oct. 30, 1928.
C. A. DAWLEY
1,689,776
FLOW METER
Filed April 4, 1924
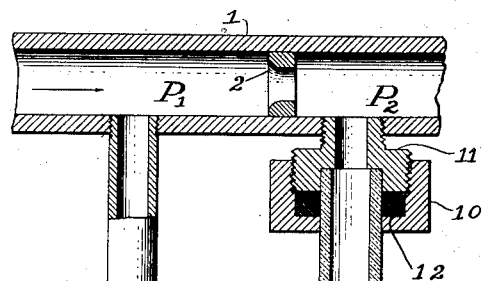
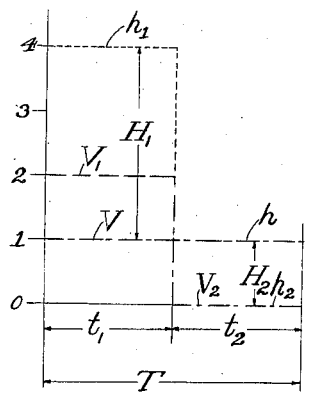
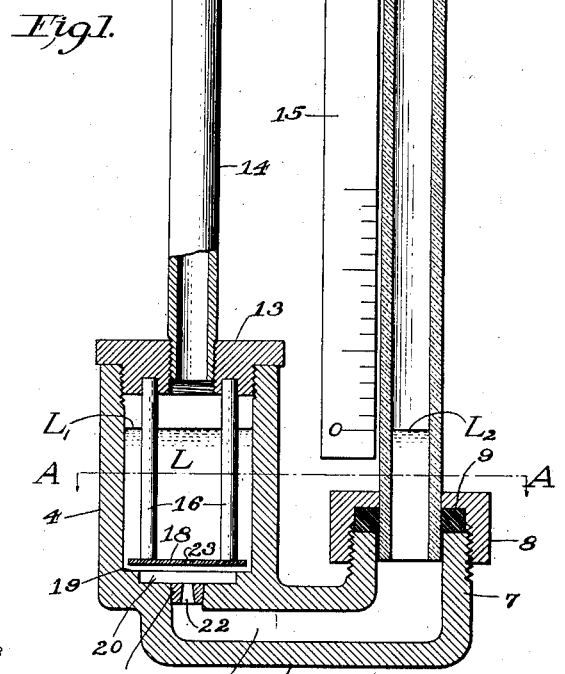
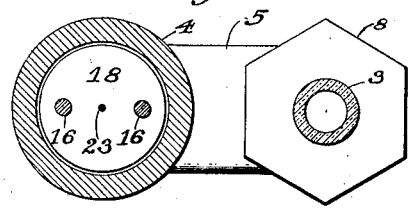
Inventor
Clarence A. Dawley.

Patented Oct. 30, 1928.

1,689,776

UNITED STATES PATENT OFFICE.

CLARENCE A. DAWLEY, OF PLAINFIELD, NEW JERSEY.

FLOW METER.

Application filed April 4, 1924. Serial No. 704,243.

My invention relates to meters of the type in which quantity flowing is deduced from a differential pressure or head established in the flow stream, and more particularly to an improved manometer for measuring head and automatically correcting or compensating for the effect of pulsating flow. The term "pulsating flow" as generally understood, and as used in this specification, refers to flow which is instantaneously variable, such variation being usually periodic and recurring; as, for example, the flow of air from a single-acting single-cylinder air compressor, which varies from maximum to zero during a period or cycle consisting of one revolution of the crank shaft.

Meters of the "head" type, including Venturi tubes, Pitot tubes, disc orifice and flow nozzle styles, all work on the principle that the head established varies as the square of the rate of flow, or that the flow is proportional to the square root of the head. This law is well established for flow which is non-pulsating but it is well known that manometer meters heretofore used will not correctly measure pulsating flow according to the square root law.

In my co-pending application, Serial Number 523,902, filed Dec. 21, 1921, I show, but do not claim in that application, a pulsation compensated manometer similar to that herein described and claimed. An extended discussion of the theory of pulsating flow in its effect on head meters will be found in the above-mentioned application.

The object of my present invention is to provide a liquid manometer for use as an element of a flow meter, which manometer will correctly show the head on a steady flow, and which will also automatically compensate when the flow is pulsating, so that flow may be computed from the observed head according to the same square root law. Further objects of my invention are pointed out in the description and claims.

In the accompanying drawings, Fig. 1 is a vertical section of my improved manometer shown connected to a pipe which is fitted with a flow nozzle, the whole constituting a simple form of flow meter. Fig. 2 is a cross section on line A—A of Fig. 1. Fig. 3 is a section through the reservoir of the manometer with certain parts removed, and Fig. 4 is a diagram for illustrating the effect of pulsating flow.

Referring to Fig. 1 and Fig. 2, 1 is a pipe in which a fluid to be measured flows in the direction shown by the arrow. 2 is a flow nozzle inserted in the pipe. 3 is a glass manometer tube connected by means of fitting 11, packing ring 12 and gland nut 10, so as to be subject to pressure $P_2$ of pipe 1. 4 is the reservoir portion of the manometer, connected by base 5 with boss 7, which latter is connected to the lower end of the glass tube by packing ring 9 and gland nut 8. Reservoir 4 is closed at its upper end by cover 13. Pipe 14 communicates with the interior of reservoir 4 and with pressure $P_1$ of pipe 1. A passage 6 connects reservoir 4 with boss 7 and thereby establishes connection between the liquid L in reservoir 4 and that in tube 3. A plug 21 inserted in passage 6 has a restricted orifice 22 which damps or retards the flow of liquid between reservoir and tube. A disc 18 seats on seat 19 at the lower end of reservoir 4. This disc is limited in its lift by two or more pins 16 supported by cover 13. Disc 18 has an orifice 23 of smaller diameter than orifice 22 of plug 21. The seat is counterbored to form a recess 20 of large diameter so that liquid acting upward on disc 18 will act on a large part of the surface. Scale plate 15, mounted in any convenient manner, serves as a reference to show the level $L_2$ of the liquid in tube 3. When there is no head acting on the liquid in the manometer, the liquid will stand at the same level, $L_1$ in the reservoir and $L_2$ in the tube. The level $L_2$ should then correspond with the zero mark on scale 15. The cross section of the reservoir is preferably larger than that of the tube, so that under the action of head on the manometer, the liquid level $L_1$ falls less than level $L_2$ rises. If the relation is known, a single reading of the level $L_2$ will give the total head. Disc 18 is of thin sheet metal to make it very light. It may be of aluminum for extreme lightness. The disc is shown as in open position, restricted by stop pins 16 to a very small lift, usually only a few thousandths of an inch. In Fig. 3, the disc and pins have been removed so as to show seat recess 20, plug 21 and orifice 22.

When the flow in pipe 1 is steady and uniform, disc 18 will remain constantly on its seat and the liquid in reservoir will communicate with liquid in tube through orifices 23 and 22. The disc in that case has no effect on the reading of level $L_2$ after this has once come to rest. Explanation of the action under pulsating head will be most easily understood by reference to an example. Referring to Fig. 4, in which vertical distance represents rate of flow and head, and horizontal distance represents time, assume that unity rate of flow V, with flow steady and non-pulsating, represents unity head, e. g. a flow of one foot per second might give a head of one foot on the manometer liquid. Suppose that the average flow remains the same, but that during a time cycle T, the total flow occurs in time interval $t_1$ and there is no flow during the equal interval $t_2$. Then during $t_1$ the flow will be 2 and the corresponding instantaneous head, varying as the square of the rate of flow, will be 4. During interval $t_2$ the flow and the head will both be zero. The average flow during time T is then 1, but the average head is 2 and the apparent flow, if computed as the square root of the average head, would be $\sqrt{2}$ or 1.41. In other words the apparent flow, based on average head, would be 41% in excess of the actual. An ordinary manometer, damped in the usual way by means of a pet cock controlling the passage 6, would give a reading approximating the average head and the flow indicated would therefore be very erroneous. This theory corresponds quite closely with actual experience.

A pulsating flow of the character described will tend to cause the manometer liquid to surge violently up and down. During interval $t_1$ flow will be from the reservoir, through orifice 23 of disc 18 (the disc itself resting on seat 19), then through orifice 22 and passage 6 to tube 3. During interval $t_2$ the flow will be in reverse direction, from tube 3 through passage 6 and orifice 22 to recess 20 under the disc. Flow from recess 20 to the reservoir is partly through orifice 23 of the disc but mainly through the seat of the disc and around its periphery. For convenience in terminology we will define flow from reservoir to tube, which causes level $L_2$ to rise, as "upward motion" of the manometer liquid; similarly flow from tube to reservoir will be termed "downward motion" of the manometer liquid in the following description and claims. Orifice 23 is the controlling resistance for upward motion, and orifice 22 is the controlling resistance for downward motion of the liquid. The resistance to flow under and around the disc from recess 20 to reservoir is here considered to be negligible as compared with that of orifice 22. In reality it is the combined resistance which controls but for simplicity we will for the moment consider that the disc offers no resistance to downward motion of the liquid. As previously stated, orifice 23 is smaller than orifice 22 and hence offers greater resistance to liquid flow than orifice 22. Furthermore, orifice 22 may be tapered, having a larger entrance from its lower end than from its upper end and offering less resistance to flow when the flow enters at the larger end. It is evident that when the head established in pipe 1 is fluctuating, the monometer liquid, in attempting to follow these fluctuations, will encounter greater resistance to upward motion than it does to downward motion. It is desired to have the reading of the manometer fluctuate only slightly, so that the average may be readily observed, and to have the average correspond to the head that would be caused by the same average flow if steady. If orifices 22 and 23 are both sufficiently small and if they are of correct size relative to each other, this result can be accomplished. To determine the relative size of these orifices, we may assume that the observed average head on the pulsating flow of Fig. 4 is one foot of liquid column, the same as for the steady flow. Then during interval $t_1$, the net head tending to cause upward motion of manometer liquid will be $H_1$ as shown on diagram, or 4−1 equals 3. During $t_2$ the net head tending to cause downward motion of the liquid will be $H_2$ as shown on diagram, or 1−0 equals 1. For the observed head on manometer to remain at a contant average value during a series of cycles like that of interval T, it is necessary that the same volume of manometer liquid should flow through orifice 23 under influence of head value 3, as flows through orifice 22 under influence of head value 1. Using the hydraulic formula, the upward and downward motion will be equal if the area of orifice 22 is $\sqrt{3}$ x area of orifice 23. This value may be modified slightly by the tapered form of orifice 22 and by the resistance offered by the disc itself, but I have found that values determined as above are substantially correct in practice.

For a pulsating flow of different character, it may be desirable to use slightly different proportions, but I have found that any type of pulsation commonly encountered in practice may be compensated in this matter, and further that a compensated manometer, even if not proportioned exactly for the flow cycle on which it is used, will give results much more nearly accurate than will an uncompensated manometer.

In most cases of reciprocating tools, etc., which produce pulsating flow, the action is very rapid, the flow cycle often covering only a small fraction of a second. Disc 18 must therefore be very quickly responsive and, for this reason, it is important that it be of very light weight, that a large part of its area be exposed to the action of liquid, and that its lift be limited. Orifice 22 is preferably formed in a removable plug 21 so as to permit easy change to another size orifice, as well as for convenience in manufacture. Also because, in some cases, it is possible to omit plug 21 entirely and to obtain the desired restriction to downward motion of manometer liquid by the reduced area between disc and seat or by making the outside diameter of disc so nearly the same size as the inside diameter of reservoir as to provide the necessary restriction by the limited annular space at the edge of the disc.

The disc 18, together with seat 19, etc., constitute a unit which for the sake of brevity, I designate as a "check valve"; this check valve being arranged to permit flow in both directions, but more readily in one direction than in the other. Various modifications may be made in the details of design and I do not limit myself to the construction shown, but what I claim is:

1. In a fluid metering system, head producing means, a liquid manometer for showing head connected to said means, and a check valve restricting downward motion of the manometer liquid to a certain degree and restricting upward motion of the manometer liquid to a greater degree, said check valve comprising a seat with a restrictive opening and a light disc with more restrictive opening.

2. A fluid meter comprising head producing means, a liquid manometer for showing head connected to said means, a check valve regulating the flow of fluid in said manometer and comprising a seat and a disc normally seated thereon, said seat having a restrictive orifice and a counterbore, larger than the orifice, forming a recess under the disc, said disc having a restrictive orifice.

3. In a fluid meter, head producing means, a liquid manometer connected to said means, said manometer having a reservoir for liquid, a tube, and a duct communicating between said reservoir and said tube, check valve means controlling said duct and comprising a disc with a restrictive orifice, a seat for said disc, and means for limiting the lift of the disc.

4. In a fluid metering system, a liquid manometer, means for connecting said manometer to points of differential pressure in the fluid system, and means offering greater resistance to the flow of manometer liquid toward the point of lower pressure than toward that of higher pressure.

In testimony whereof I have signed my name to this specification.

CLARENCE A. DAWLEY.